United States Patent
Ward

(10) Patent No.: US 7,142,757 B1
(45) Date of Patent: Nov. 28, 2006

(54) LARGE FLATTENED MODE TUNED CLADDING PHOTONIC CRYSTAL FIBER LASER AND AMPLIFIER

(75) Inventor: Benjamin G. Ward, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/231,110

(22) Filed: Sep. 20, 2005

(51) Int. Cl.
*G02B 6/032* (2006.01)
(52) U.S. Cl. .................................. 385/125
(58) Field of Classification Search ............... 385/125
See application file for complete search history.

(56) References Cited

U.S. PATENT DOCUMENTS 6,972,894 B1* 12/2005 Bjarklev et al. ............ 359/332

2002/0197039 A1* 12/2002 Carter et al. ................ 385/127
2005/0157998 A1* 7/2005 Dong et al. ................. 385/126
2006/0034574 A1* 2/2006 Guan et al. ................. 385/125

OTHER PUBLICATIONS

Koplow et. al., Optics Letters, 25, 442 (2000).
Liu et. al., SSDLTR 2004 paper, FIBER-5 (2004).
White, el. al.,J. Opt. Soc. Am. B19, 2322 (2002).

* cited by examiner

*Primary Examiner*—Michelle Connelly-Cushwa
*Assistant Examiner*—Jerry T Rahll
(74) *Attorney, Agent, or Firm*—Kenneth E. Callahan

(57) ABSTRACT

A modified photonic crystal fiber yielding a higher peak power for a given maximum intensity. The multi-mode signal core has a depressed index of refraction that pushes the mode distribution to the core edges while a pattern of larger air holes is used to flatten the mode distribution. The core is further surrounded by tuned cladding elements defined by a pattern of smaller air holes that cause loss in all of the core modes except the fundamental while maintaining robust guiding of the fundamental mode.

1 Claim, 5 Drawing Sheets

LARGE FLATTENED MODE TUNED CLADDING PHOTONIC CRYSTAL FIBER LASER AND AMPLIFIER

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

Fiber lasers and amplifiers make use of a dielectric waveguide, the fiber, to constrain the degrees of freedom of the electromagnetic field while it is amplified by excited laser atoms within the core of the fiber. Given an amplifying waveguide, a fiber laser is formed by introducing it into a resonant cavity. One of the main advantages of fiber lasers is that if a single transverse waveguide mode is present in the fiber, then the output will have diffraction limited beam quality. Only one type of dielectric waveguide is considered here, a modified total internal reflection photonic crystal fiber (MTIR PCF), also known as solid-core photonic crystal fiber, microstructured fiber, or holey fiber. All fibers are assumed to be uniform along their length (axisymmetric) and, therefore, completely determined by the geometry of their cross-section.

FIG. 1 is a typical MTIR PCF with plots showing relevant parameters. FIG. 1a is the cross-section of a standard photonic crystal fiber lattice with 10-micron spacing between lattice elements. It consists of an array of air-filled circular inclusions 12 in the fiber material 11 and a core 13 comprised of an area in the fiber material 11 in the center that is missing air holes. The inner cladding 11 is enclosed by an outer cladding 14. The multimode central core 13 is appropriately doped with an active lasing ionic species designed for operation at a desired fundamental wavelength mode. The array can be described as a uniformly spaced lattice with one or more defects comprising the core and consisting of a missing or filled-in hole. FIG. 1b is a plot of the calculated effective index vs. mode number of the lattice in FIG. 1a. The plot in FIG. 1c shows the calculated fundamental (solid line) and higher order (dashed lines) core normalized modal intensity vs. the position within the core in units of lattice spacing (10 microns). The arrows between FIGS. 1b and 1c show the effective index correspondence of the modes.

The guiding mechanism for a MTIR PCF can be thought of in the context of total internal reflection. Rays within the core that hit the air holes will be reflected due to the index difference on the boundary of the air hole. Maxwell's equations may be solved to determine the detailed characteristics of the guided mode.

In general, the modes of an MTIR-PCF may be described by an electromagnetic field distribution over the cross-section of the fiber and a propagation constant that determines the periodicity of the fields along the axis of the fiber at a given optical wavelength. In addition to the guided modes, there are also modes that are not localized to the core. In these modes, the field intensity is spread across the cladding and they are called cladding modes. Their properties will be determined by the geometry of the cladding, specifically, the index difference at the cladding boundary. Double-clad fibers have a region outside the cladding in order to confine pump light to the cladding. These fibers are also called cladding pumped fibers. Single-clad fibers have no special material outside the cladding except that which provides mechanical stability to the fiber.

The signal in the core of a single-mode fiber also experiences loss as a result of manufacturing irregularities and physical perturbations such as bending. The lost energy transfers to the cladding modes in this case. This can be viewed as a coupling process. The irregularities cause the core mode to couple to the cladding modes. Cladding modes may also be characterized by a field distribution and propagation constant.

The maximum power in a diffraction-limited beam from rare-earth doped fiber lasers is limited by the maximum electromagnetic intensity that can persist within the core without undesired effects and the maximum core area that can operate with a single propagating transverse mode. The intensity limit is fixed by the material properties. Therefore, any significant increase in power output must be achieved by increasing the core size and flattening the mode for a given maximum intensity level. As the core size of a modified total internal reflection photonic crystal fiber is increased, either the beam quality degrades due to the propagation of multiple transverse modes, or the fundamental mode losses become excessive as the waveguide is made weaker by decreasing the air hole size in order to eliminate the higher order modes. Standard single-mode fibers designed to operate at a wavelength of about 1 micron have a core diameter of approximately 7 microns. One successful strategy that has yielded a three-fold increase in core size is to use a fiber with a core supporting multiple modes, but then introducing mode-dependent losses so that the higher order modes experience more loss than the fundamental mode. In other words, the higher order modes experience a greater amount of coupling into the cladding modes. By the time the signal reaches the output of the fiber, only the fundamental mode is propagating in the fiber core.

In practice this mode discrimination is often accomplished in a step index fiber by coiling the fiber at an optimal radius. A coiled fiber exhibits substantially more loss in the higher order modes than the fundamental for a core sized up to approximately 25 microns (Koplow et. al., Optics Letters, 25, 442 (2000).) Above this diameter, however, the loss differential between the modes becomes so small that it does not sufficiently discriminate the fundamental mode from the higher order modes during amplification. (Liu et. al., SSDLTR 2004 paper, FIBER-5 (2004).) If larger area cores are sought, the tradeoff between fundamental mode loss and multi-mode operation is unavoidable if the cladding around the core is uniform, either in the sense of having a uniform index of refraction or having a uniform array of air holes in the case of the MTIR PCF. The uniformity of the cladding causes the cladding modes to couple uniformly to the fundamental mode and the undesired higher order guided modes leading to inefficient mode discrimination.

The maximum power in a diffraction-limited beam from rare-earth doped fiber lasers is currently limited by the maximum core area that can operate with a single propagating transverse mode and the maximum intensity permitted by material limitations. Increases in the core area is the subject of co-pending U.S. patent application Ser. No. 11/204,146 filed Aug. 15, 2005 and is hereby incorporated by reference. That application enabled large increases in the core area but with a relatively narrow profile of the fundamental mode intensity curve.

Further power increases will not only require a fiber with a larger core area as obtained with the tuned cladding fiber designed for a multimode central core, but also will need to flatten the intensity curve for a given maximum intensity level.

DESCRIPTION OF THE PREFERRED EMBODIMENT

Computer simulations show that microstructures that guide a fundamental mode with an effective index matched to the effective index of the undesired higher-order modes will couple the power away from the undesired modes in the core. This is analogous to index matching at an optical boundary inhibiting reflection at that boundary. Different detailed microstructures may, therefore, be used for each of the different undesired modes in the core.

Figure 1A:
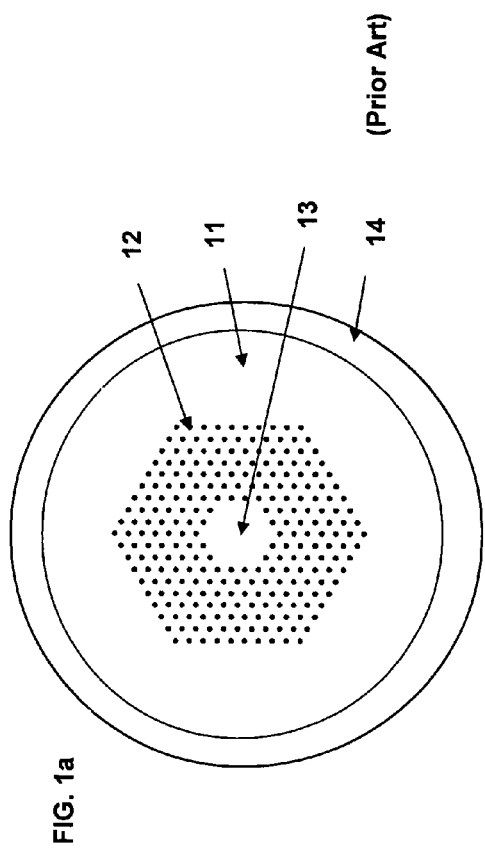
FIG. 1a is a standard photonic crystal fiber lattice in cross-section.
Figure 1C:
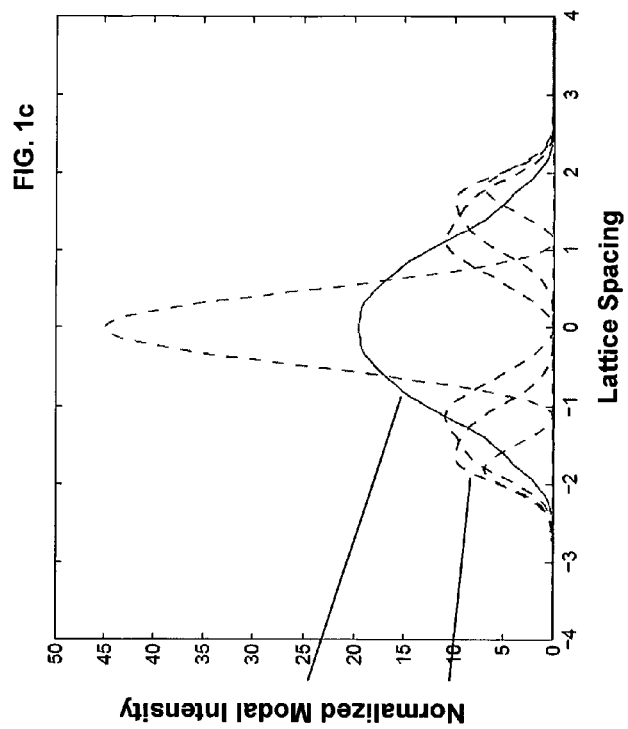
FIG. 1c is a plot of calculated fundamental and higher-order core normalized modal intensity vs. position in standard photonic crystal fiber in units of lattice spacing.
Figure 1B:
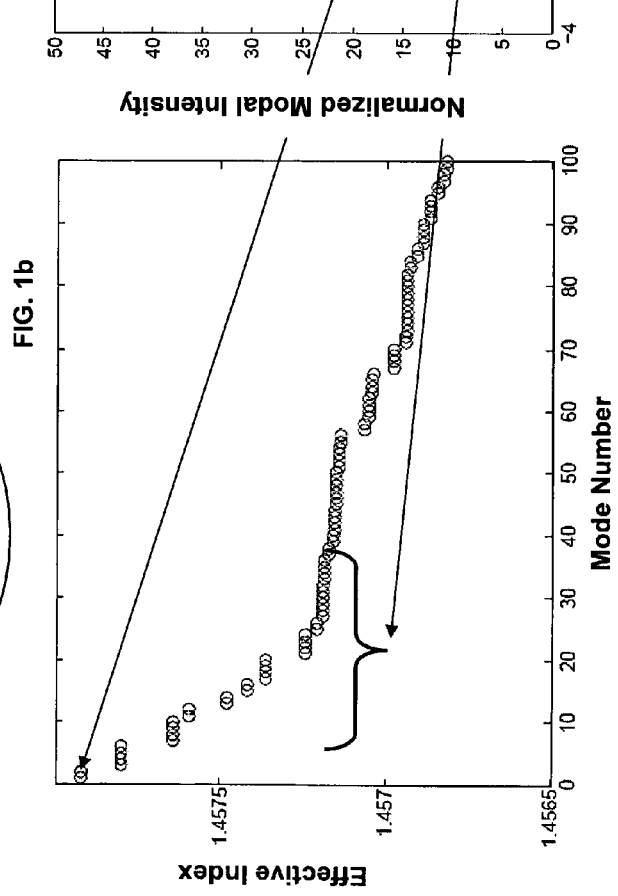
FIG. 1b is a plot of calculated effective index vs. mode number for a standard photonic crystal fiber.
Figure 2A:
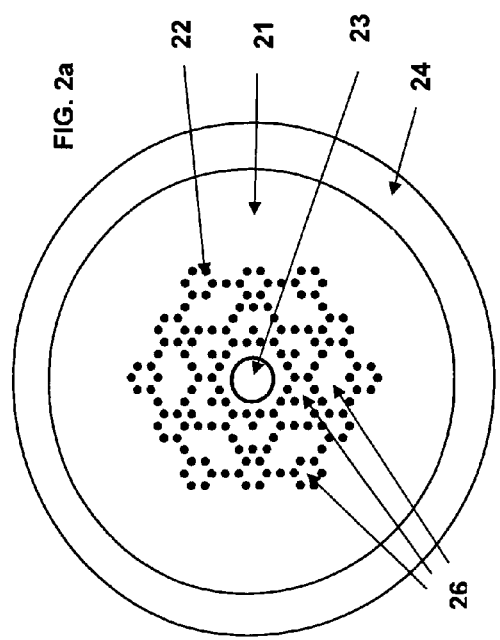
FIG. 2a is a tuned cladding fiber lattice in cross-section.

Increases in the core area are the subject of co-pending U.S. patent application Ser. No. 11/204,146 filed Aug. 15, 2005. FIG. 2a is a cross-section of a tuned cladding fiber example from the '146 application having an outer cladding layer 24 of uniform index of refraction $n_3$. The inner cladding 21 is comprised of tuned cladding fiber material that has an average index of refraction of $n_2 < n_3$ that is either homogeneous (glass of index $n_1$) or microstructured (glass tuned element areas 26 defined by missing or filled in air holes). In this tuned cladding fiber, the geometry of the material forming the inner cladding 21 is engineered to produce cladding modes that efficiently couple to the undesired guided modes but not to the fundamental mode. This is accomplished by calculated microstructure elements 26 (tuned elements) in the inner cladding 21. The shapes 26 in FIG. 2a are only examples, a general tuned element being comprised of any arrangement of missing or filled in air holes or the inclusion of air holes of arbitrary size. These tuned elements 26 are defined by air holes 22 in the glass 21, similar to a photonic crystal fiber with a non-uniform but purposefully designed lattice of air holes. The multimode central core area 23 is doped with an active lasing ionic species designed for operation at a desired fundamental wavelength. It may be counter doped to maintain a constant glass index $n_1$. The tuned elements 26 and the multimode central core area 23 are comprised of glass.

Single or multiple instances of each tuned element may be employed to provide a path, not unlike a transmission line, for the energy in the undesired core modes to be coupled all the way out to the outer cladding 24. If the cladding modes are tuned in this manner, the overall average index of the inner cladding 21 can be lower, thus ensuring robust guiding and amplification through the gain medium 23 of the fundamental mode with low loss. This effect will only occur at specific wavelengths for which the fiber must be designed. Away from this wavelength, the inner cladding will no longer be tuned to the higher order modes of the core 23. This is in contrast to the ability for conventional TIR PCF to exhibit endlessly single mode behavior over a wide wavelength range.

Figure 2C:
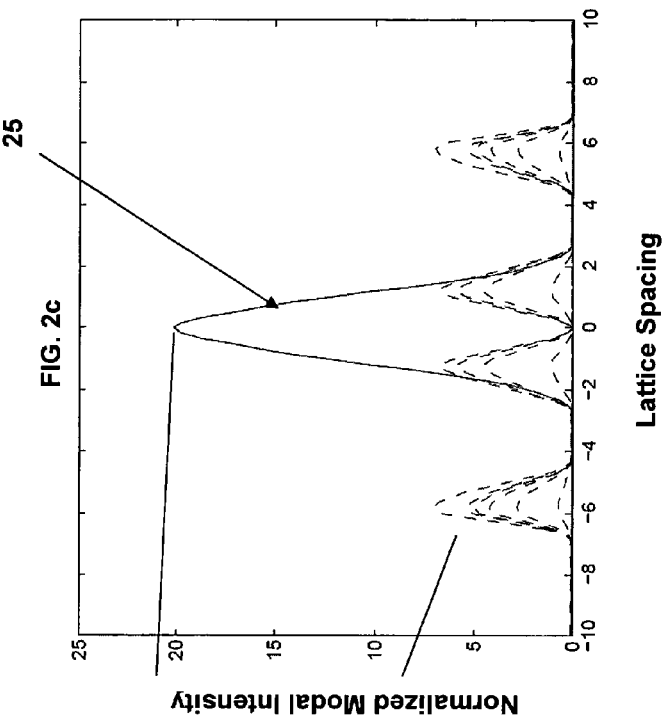
FIG. 2c is a plot of calculated fundamental and higher-order core normalized modal intensity vs. position in the tuned cladding fiber in units of lattice spacing showing power coupling out of the undesired core modes.
Figure 2B:
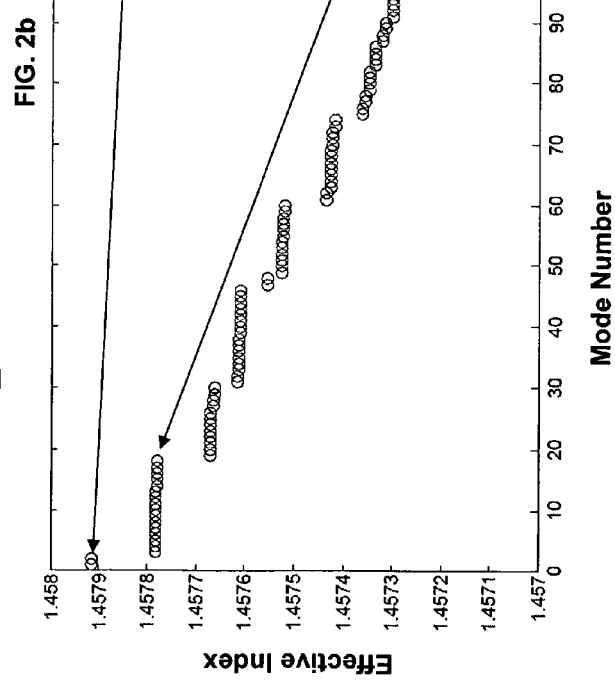
FIG. 2b is a plot of calculated effective index vs. mode number for a tuned cladding fiber.

FIG. 2 shows a tuned cladding fiber designed for a multimode central core 23 size of 52 microns, an operating wavelength of 1064 nanometers, and a line width of <100 MHz. The lattice pitch is 10 microns, and the diameter of the air holes is 3.2 microns with a hexagonally close packed spacing. The lattice of tuned elements that best coupled out the undesirable core modes in this example is shown in FIG. 2a. FIG. 2b is a plot of the calculated effective index vs. mode number for the tuned cladding fiber of FIG. 2a. FIG. 2c is a plot of the calculated fundamental (solid line) and higher-order (dashed lines) normalized modal intensity vs. the position in the tuned cladding fiber in units of lattice spacing (10 microns) showing power coupling out of the undesired core modes. The arrows show the effective index correspondence of the modes. Note the high but narrow peak intensity 25 curve achieved for the fundamental mode. For a given maximum intensity permitted by the fiber material characteristics, a higher peak power can be obtained by broadening the peak intensity curve.

One embodiment of the present invention is a method for designing large mode area photonic crystal fibers in which the mode is flattened in order to give a higher peak power for a given maximum intensity. This is accomplished by lowering the refractive index in the core ($n_{core}$) to slightly below that of silica $n_1$ and adjusting the size of selected air holes within the inner cladding. The lowered index of the core, $n_{core}$, is still higher than the average index $n_2$ of the inner cladding.

Figure 3:
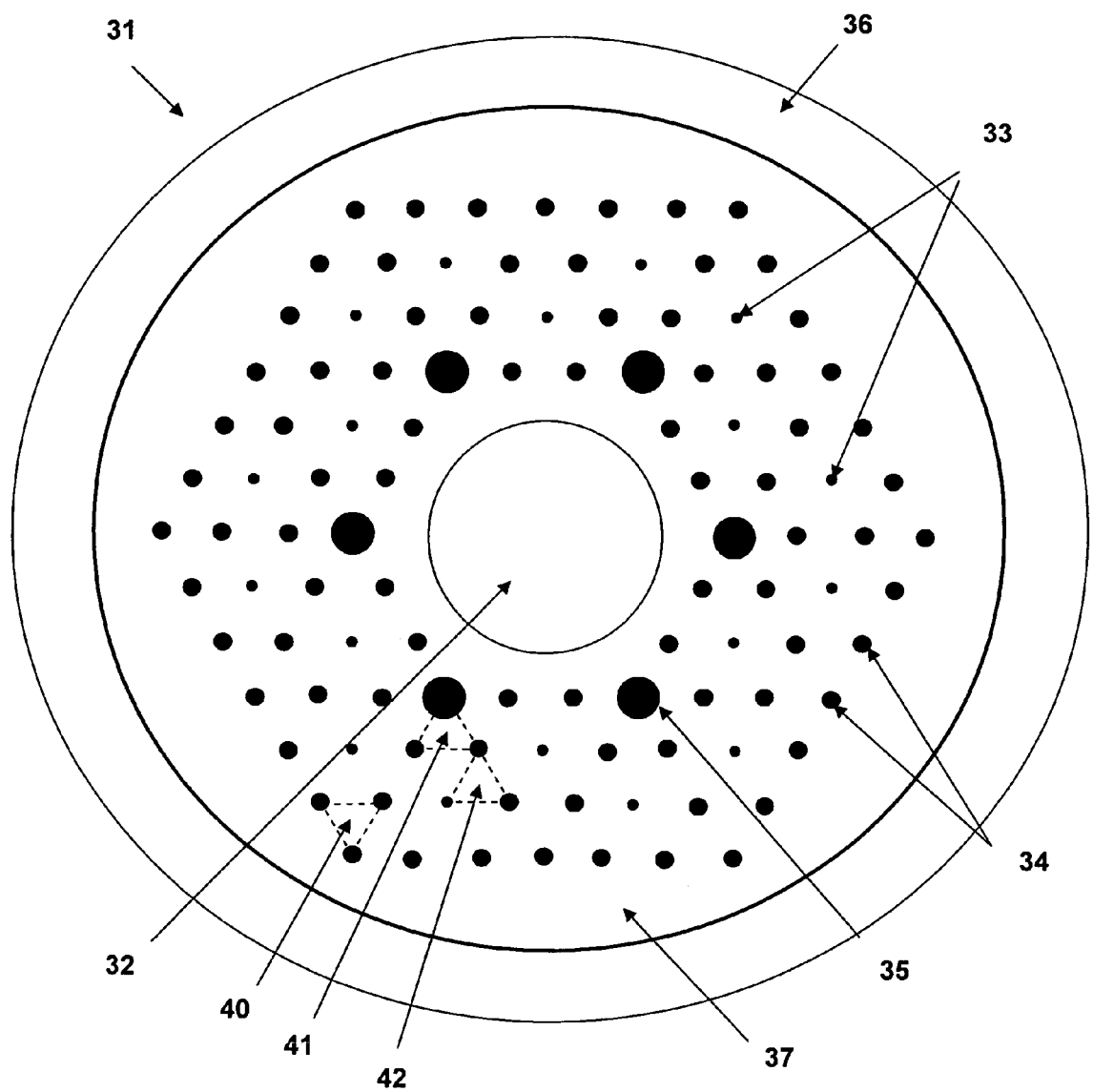
FIG. 3 is a cross-section of tuned cladding photonic crystal fiber yielding a large flattened fundamental mode intensity curve showing the core area, inner cladding, an outer cladding.

FIG. 3 is an example of a large flattened mode tuned cladding photonic crystal fiber (LFMTCPCF) 31. The outer cladding layer 36 has a uniform index of refraction $n_3$. The inner cladding 37 is comprised of tuned cladding fiber material that has an average index of refraction of $n_2 < n_3$ that is either homogeneous (glass of index $n_1$) or microstructured (glass tuned element areas defined by missing or filled in air holes of varying diameter). The geometry of the material forming the inner cladding 37 is engineered to produce cladding modes that efficiently couple to the undesired guided modes but not to the fundamental mode. This is accomplished by calculated microstructure elements, such as 40, 41, 42 (tuned elements) in the inner cladding 37. These tuned elements 40, 41, 42 are defined by air holes in the glass 37, similar to a photonic crystal fiber with a non-uniform but purposefully designed lattice of air holes. The tuned elements 40, 41, 42 and the multimode central core area 32 are comprised of glass. In this example, the air hole diameters are 1, 3, or 8 microns in diameter 35, 34, or 35, respectively, and the hole spacing is 10 microns on center. The lowered core index flattens the core mode but concentrates the energy in the corners. The 3- and 8-micron air holes push in the corners yielding the desired even flattened mode. The 1-micron holes define tuned elements that dissipate the higher order modes of the core.

Single or multiple instances of each tuned element may be employed to provide a path, not unlike a transmission line, for the energy in the undesired core modes to be coupled all the way out to the outer cladding 36. If the cladding modes are tuned in this manner, the overall average index of the inner cladding 37 can be lower, thus ensuring robust guiding and amplification through the gain medium 32 of the fundamental mode with low loss. This effect will only occur at specific wavelengths for which the fiber must be designed. Away from this wavelength, the inner cladding will no longer be tuned to the higher order modes of the core 32. This is in contrast to the ability for conventional TIR PCF to exhibit endlessly single mode behavior over a wide wavelength range.

The multimode central core area 32 of FIG. 3 is doped with an active lasing ionic species designed for operation at a desired fundamental wavelength. In this example, the doped core 32 parameters are: $\Delta n = -8.0 \times 10-4 \pm 1.0 \times 10-5$, absorption equals 320 decibels per meter times the ratio of the areas of the core and pump cladding at 975 nm, and the spatial extent of the core area is 50 microns. The effective diameter is 100 microns and the effective area is 7,800 square microns. These calculations were performed using the multi-pole method (White, el. al., J. Opt. Soc. Am. B19, 2322 (2002).

Figure 4:
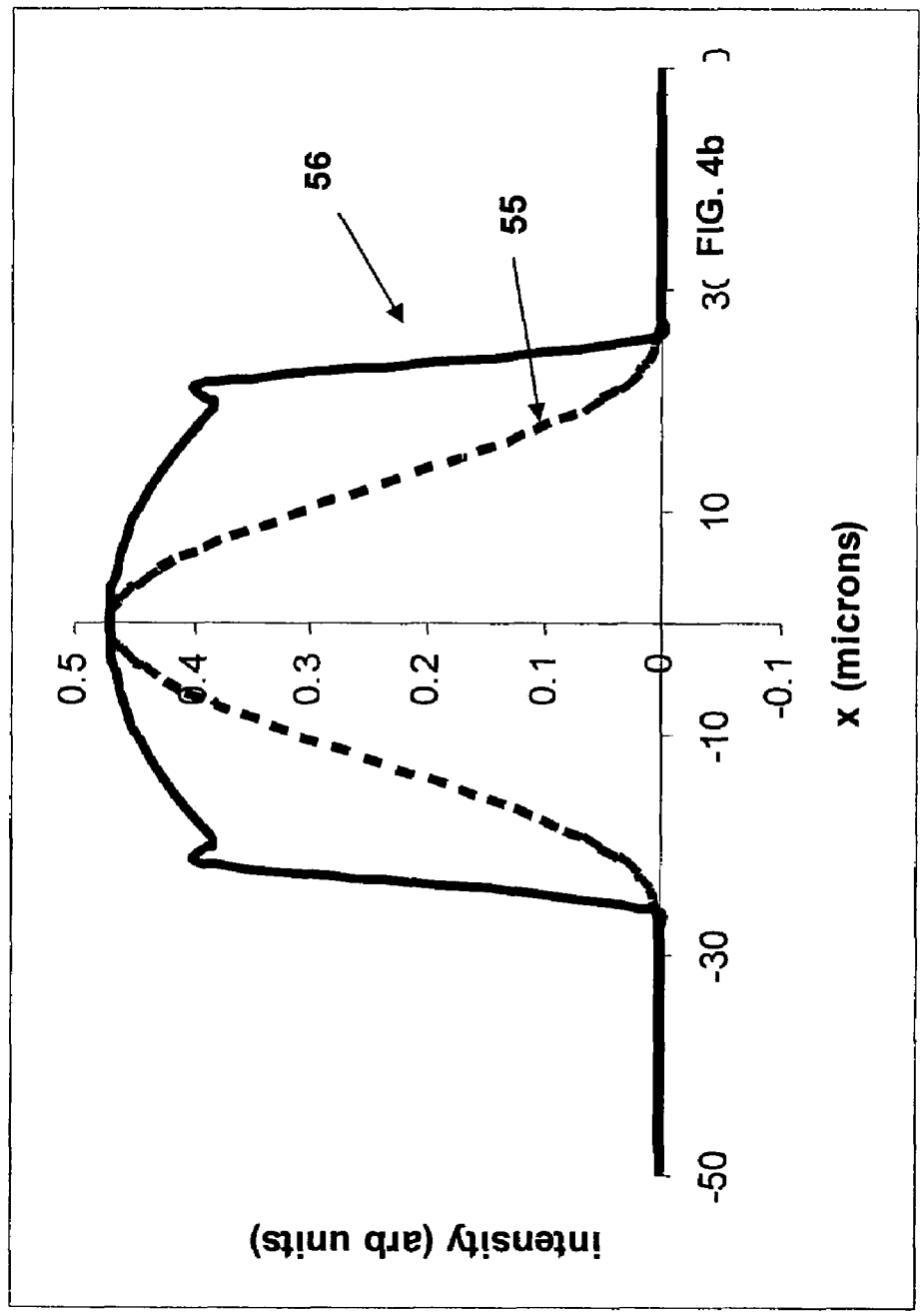
FIG. 4 is a plot of the fundamental mode intensity (solid line) in arbitrary units of the LFMTCPCF vs. the distance in microns from the center of the core area overlaid with the corresponding mode intensity (dashed line) of the standard tuned cladding fiber of FIG. 2c.

FIG. 4 is a plot of the fundamental mode intensity in arbitrary units vs. the distance in microns from the center of the core area. The dashed line 55 is the fundamental mode intensity for a standard tuned cladding fiber (see FIG. 2c). The solid line 56 is the intensity of the fundamental mode for the LFMTCPCF of FIG. 3 demonstrating the ability of producing a higher peak power for a given maximum intensity.

The core of this fiber is multi-mode. However, single mode operation can be obtained by low overlap of the mode profile with the gain provided by the active core region and high loss in the higher order modes. Low overlap is achieved by using a tuned cladding (as per application Ser. No. 11/204,146) and by depressing the index of the core thereby pushing the mode distribution to the core edges. The 1-micron holes in FIG. 3 create the tuned elements. The 3-micron holes are the base lattice within which the 1 micron holes form the tuned elements. The 8 micron holes push the corners of the core inward leading to a more circular mode since these holes are further from the center of the core than the others forming the core boundaries. High loss is achieved by using a tuned inner cladding 37 that index matches the higher order modes thus allowing them to pass through the lattice into the outer cladding 36.

Figure 5:
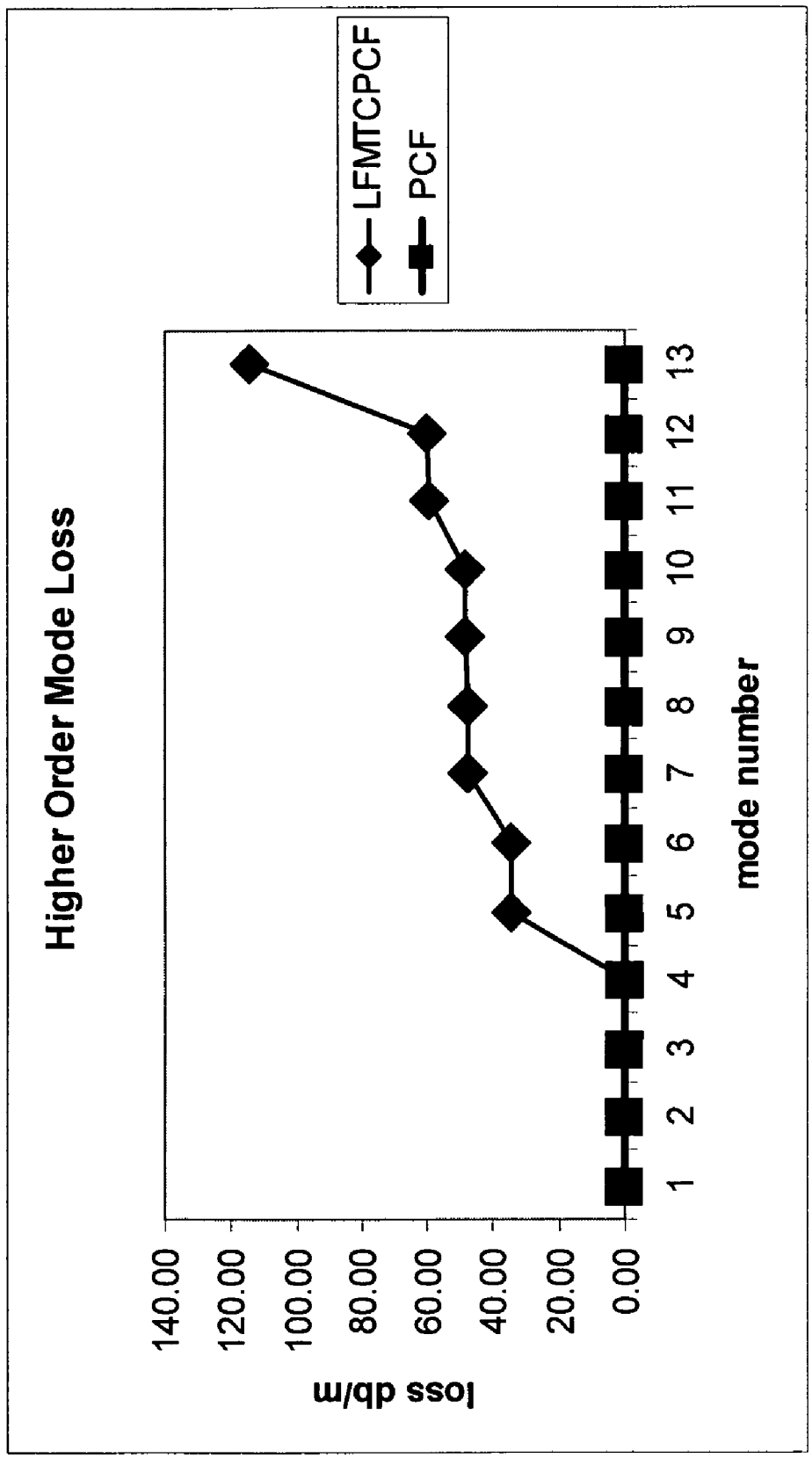
FIG. 5 is a plot of the higher order mode loss vs. mode number for a standard photonic crystal fiber and for the LFMTCPCF for the particular set of parameters used in FIG. 3.

FIG. 5 is a plot of the higher order mode loss vs. mode number for a standard photonic crystal fiber and for the large flattened mode tuned cladding photonic crystal fiber having the previously enumerated characteristics. The fundamental mode loss for the LFMTCPCF is 0.07 db/m demonstrating that the tuned elements cause very high loss in the undesirable higher order modes only and not in the fundamental mode.

The design analysis process for the LFMTCPCF is comprised of a sequence of steps. The geometry of the core is chosen first by determining how many missing air holes there will be. The next step is to increase the size of the air holes at the corners of the core region to create a more circular effective core area. Then specify the average index of the inner cladding in order to achieve the desired fundamental mode loss for the particular operating parameters of the laser such as the laser ion species, the pump power, the output power, and for an amplifier, the input power and gain. Next, calculate the effective indices and for all the guided modes in the core. There are several methods for calculating the effective indices of guided fiber modes including the beam propagation method, the plane wave expansion, and the multi-pole method. These methods have been implemented in commercially available software packages. For a regularly shaped core, circle or hexagon for example, there will be many degenerate modes. For example, the University of Sydney in Australia has a software program to calculate the modes of an arbitrary photonic crystal structure with circular air holes. The software is available from their website at: http/www.physics.usyd.edu.au/cudos/mofsoftware/index.html.

Next determine the core index difference $\Delta n$, i.e., the difference between the average inner cladding index and the core index. Depressing the index of the core slightly below that of glass $n_1$ pushes the mode distribution toward the core edges. Then calculate the mode shape (intensity distribution 56 of the fundamental mode, FIG. 4b) for different values of the index difference $\Delta n$ and choose the value that gives the desired flattened mode shape. Once this step is finished, the remaining process is the same as that for the tuned cladding fiber (application Ser. No. 11/204,146).

Specifically, for each undesired, higher order core-guided mode, specify a tuned element geometry whose fundamental mode effective index matches the effective index of that core-guided mode. Begin with a tuned element size approximately equal to the size of the local maxima in the intensity in that mode and calculate the effective index. If it is higher than the effective index of the specified core mode, then make the tuned element slightly smaller and if it is lower, make the tuned element slightly larger. Refine the tuned element geometry in this manner until the effective indices match to within the manufacturing tolerances for the fiber, usually on the order of $10^{-4}$ in the index of refraction. Then check to see if any of the higher order modes of the tuned element accidentally match any of the higher order modes of the core. If this is the case, then these higher order modes do not need a separate tuned element with matching fundamental mode. Once all the required tuned elements are identified, place them within the cladding in multiple instances leading from the neighboring region of the core to the uniform cladding area. Then, calculate the effective index and power loss per unit length of each of the modes of the overall structure. The tuned elements will cause overall modes to propagate with a slightly different effective index then they would individually due to coupling between elements. At this point, slightly vary the size of each tuned element so that there are no higher order modes localized in the core and the fundamental core mode is the only localized mode or so the loss in the higher order modes is maximized relative to that of the fundamental mode.

The design may then be incorporated into a fiber pre-form and the fiber fabricated through the normal draw process. Once the fiber is drawn, it may be incorporated into a laser or amplifier in the standard fashion. The tuned cladding fiber may or may not be double clad, however, for large power handling capacity, it is anticipated that the fiber will normally be double clad.

The invention claimed is:

1. A method for designing a tuned cladding fiber for laser or amplification operation at a desired fundamental wavelength mode, said tuned cladding fiber comprised of an outer cladding of uniform index of refraction of $n_3$ and an inner cladding with a large, multimode central core doped with an active lasing ionic species designed for operation at a desired fundamental wavelength mode, said inner cladding having material comprised of glass of index $n_1$ and a plurality of air holes of varying size and position yielding an average index of refraction $n_2$, $n_2$ being less than $n_1$ and less than $n_3$, said multimode central core being the transmission path for guiding said desired fundamental wavelength mode and undesired, higher order guided modes, and said inner cladding further comprised of tuned elements designed to provide a path for said undesired, higher order guided modes to be coupled out to said uniform index cladding layer, the method comprised of:

a. choosing a core size and geometry for the central core;

b. increasing the size of air holes at the corners of the central core region;

c. specifying an average index of refraction for said tuned cladding fiber material that will achieve a desired fundamental mode loss for the particular operating parameters of a selected laser or amplifier;

d. calculating the effective index of refraction for all the guided modes in said multimode central core;

e. counter doping the core region by $\Delta n$ to depress the core index to slightly below that of glass $n_1$ but remaining greater than $n_2$, to thereby push the mode distribution toward the core region edges;

f. calculating the intensity distribution of the fundamental mode for different values of the index difference $\Delta n$ and choosing the value that gives the desired flattened mode shape;

g. specifying for each undesired, higher order guided mode, a tuned element geometry whose fundamental mode effective index matches the effective index of that guided mode, beginning with a tuned element size approximately equal to the size of the local maxima in the intensity in that mode and calculating the effective index, such that if the calculated effective index is higher than the effective index of the specified core mode, making said tuned element slightly smaller, and if it is lower than the effective index of the specified core mode, making said tuned element slightly larger, refining said tuned element geometry in this manner until the effective indices match to within the manufacturing tolerances for said fiber;

h. checking to see if any of the undesired, higher order modes of said tuned element match any of the higher order modes of said multimode central core, whereby if such a match occurs, these higher order modes do not need a separate tuned element with matching fundamental mode;

i. placing all of the required tuned elements within said inner cladding in multiple instances leading from the neighboring region of said central core to said uniform cladding area;

j. calculating the modes of the overall structure and slightly varying the size of each tuned element whereby there are no undesired, higher order modes localized in said central core and the fundamental core mode is the only localized mode or so the loss in the higher order modes is maximized relative to that of the fundamental mode, whereby the design may be incorporated into a fiber pre-form and the fiber fabricated through the normal draw process and thereafter incorporated into a laser or amplifier in the standard fashion.

\* \* \* \* \*